Oct. 3, 1944.  E. A. FUGLIE  2,359,359

BORING TOOL ADAPTED FOR USE IN TURNING TOOL-HOLDERS

Filed Oct. 28, 1942

Inventor
ELMER A. FUGLIE
By H. A. Whiteley
Attorney

Patented Oct. 3, 1944

2,359,359

UNITED STATES PATENT OFFICE 2,359,359

BORING TOOL ADAPTED FOR USE IN TURNING TOOLHOLDERS

Elmer A. Fuglie, Winona, Minn., assignor to Winona Tool Mfg. Company, Winona, Minn., a corporation of Minnesota Application October 28, 1942, Serial No. 463,723

2 Claims. (Cl. 77—58)

My invention relates to a boring tool adapted for use in a turning tool-holder and has for its object to provide a tool adapted to be mounted in a conventional turning tool-holder, so that my tool will have its cutting edge properly set within a cast opening in the work to be bored, and will have its cutting edge suitably held relative to the axis of rotation of the object with the same effectiveness as if it were a tool held in a specially constructed boring tool-holder.

In the practice of making numerous types of articles which require a true circular hole or opening in or through the article, it is customary to cast or otherwise form the article with a preformed roughly cylindrical opening and to put the article in a machine for rotating it and to apply to the inner wall of the cast hole a metal cutter with standard means for advancing it so that, as the article is rotated, successive layers of metal will be reamed off of the surface of the hole or opening until a truly cylindrical hole is formed of the desired dimension and with a true milled surface. A number of different types of tool-holders have been devised for holding only a boring tool. Also, there are standard turning tool-holders comprising a carrying member adapted to be held in a turret attached to a fixed member and capable of oscillation up and down together with means for clamping a turning tool adapted to be adjustably held in a number of different positions. The tool used with such turning tool-holders is provided with a cutting member which engages the outer surface of the work and turns it down to a true cylinder.

The turning tool-holder, while permitting some adjustment of the carrying member, has a single square socket extending angularly with respect to the carrying member in which the tool is rigidly secured. This arrangement has substantial advantages over tool-holders wherein the tool itself is adjustably held, since difficulties are encountered in clamping the toolholder itself in different positions. My invention accomplishes the desired result used with a turning tool-holder of positioning the cutting edge of the tool itself so that it will be adapted for boring or reaming any desired hole or opening, and at the same time will present an efficient cutting incidence against the cylindrical wall of the hole or opening.

I have discovered that all the advantages of a complicated turning tool-holder may be obtained in conjunction with a boring operation by providing a boring tool with a sufficiently extended shank, preferably square or rectangular, and having a portion toward its end extending at an angle therefrom, preferably an angle approximating that of the socket with the direction of extent of the carrying member, and having rigidly mounted thereon a cutting face or point projecting from the side at the end or from the end to a point outside the limits of the tool itself, and mounting the tool so formed in the socket of a conventional turning tool-holder, which will enable said turning tool-holder to have the additional function of holding satisfactorily a boring tool.

It is a principal object of my invention, therefore, to provide a tool having a shank adapted to be locked in position in the angularly disposed socket of a conventional turning tool-holder, said tool having a portion extending at an angle to the main shank, which angle will preferably be substantially the reverse of the angle which the tool carrying socket of the carrying member has to the longitudinal extent of the carrying member.

It is a further object of my invention to provide a boring tool as above-described, adapted to be held by a conventional turning tool-holder, which shall have formed in the end of the angularly disposed portion a cutting member projecting beyond the limits of said portion.

It is a further object of my invention in its preferred form to have the main elements of the cutting part of the tool extended forward of the end of the tool at an angle so the cutting point will be outside the limits of the tool.

The full objects and advantages of my invention will appear in connection with the following specification, and the novel features by mens of which the important and desirable results above-noted may be accomplished are particularly pointed out in the claims.

Figure 1:
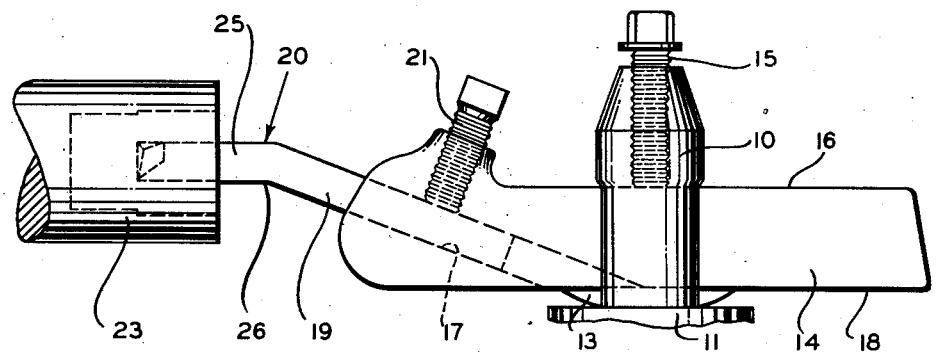
Fig. 1 is a side view of a tool in position in a conventional tool holder, in relation to a boring operation on an article having a hole to be reamed out.
Figure 2:
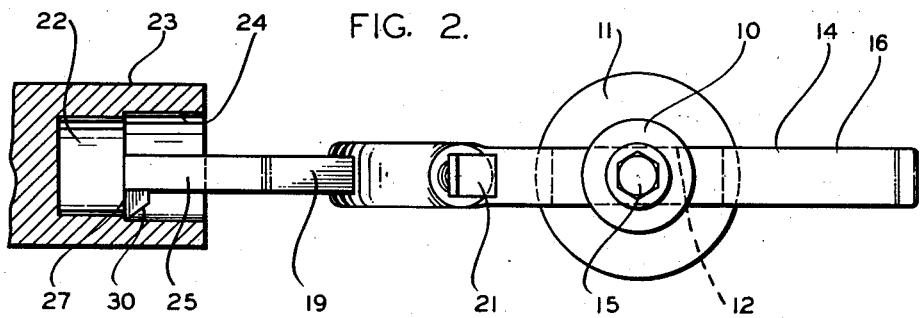
Fig. 2 is a top view of what is shown in Fig. 1, with the article being worked on shown in section.

As illustrated, a conventional turning tool-holder comprises a turret 10 fixedly secured to any suitable support as at 11. A way 12 is formed through the turret 10, as indicated in dotted lines in Fig. 2. A rocker 13 is held in a circular depression not shown, at the base of the way. Adjustable longitudinally in the way 12 is a carrying member 14 which rests upon the rocker 13, A powerful set screw 15 engaging the upper edge 16 of the carrying member 14 and threaded into an opening extending through the upper part of the turret is adapted to hold the carrying member 14 in any desired position. Through the carrying member 14 extends a socket channel 17 which is at a broad obtuse angle with the longitudinal extent of carrying member 14 and with its top edge 16 and bottom edge 18. This socket will preferably be of square cross-section or other suitable rectangular cross-section. Normally a turning tool is inserted in the socket channel 17 and is adapted to operate on the outside of the rotated work piece which is thus turned to a true outer cylindrical shape.

According to my invention I employ the same tool-holder normally adapted for holding a turning tool employed in the turning operation. In the socket 17 I position the shank 19 of a boring tool 20. The tool 20 has substantially the same cross-sectional form and area as the socket 17 and is held locked therein by the set screw 21. The tool therefore, can be advanced or retracted in socket 17 as the work requires.

The tool 20 is thus held at a very considerable angle to the line of longest extent of the carrying member 14 and yet is shaped to bring its cutting portion within the core 22 of work piece 23 so as to engage the inner wall 24 of bore 22. To do this I form my tool with a forward portion 25 bent in a broadly obtuse angle as indicated at 26 so that the portion 25 extends at an angle to the main shank 19 which is substantially that of the angle of socket 17 and shank 19 to the longitudinal extent of the carrying member 14 as limited by the edges 16 and 18. The part 25 of the tool 19 is thus adapted to be introduced into bore 22 with its lines of extension substantially parallel to the elements of the walls of bore 22.

Figure 3:
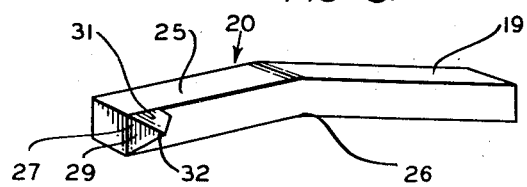
Fig. 3 is a semi-perspective view of my tool.
Figure 4:
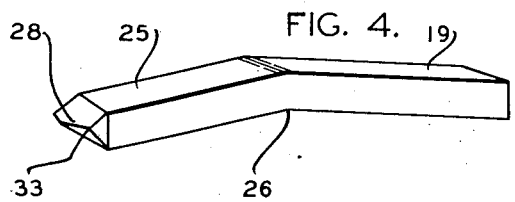
Fig. 4 is a similar view of a somewhat modified form of tool.

I provide a cutting member 27 which is rigidly attached to the angular portion 25 and is projected laterally therefrom, either directly from the side as in Fig. 3, or from the end as at 28 in Fig. 4. The form of cutting member shown in Figs. 2 and 3 embodies triangular walls 29, 30 and 31, which come together at an apex 32 forming the cutting point of the tool. In the form of Fig. 4, similar faces come to an apex 33 which constitutes the cutting point of the tool. In both forms this cutting point is outside the limits of the angular portion 25.

The advantages of my tool will be apparent. A chief advantage is that it is primarily adapted to operate in a standard tool-holder designed to be used for holding a turning tool in turning down the outside of cylindrical surfaces. By the use of my tool I am enabled to have the ordinary turning tool-holder serve the added purpose or properly supporting and holding a boring tool. This is made possible by giving my tool toward its end away from the shank held in the holding socket, a suitable bend so that the effective part of the tool will correspond to the angle of a boring tool held in a boring tool-holder. This has the advantage then of adapting a standard tool-holder to the uses of both turning and boring. An important feature of accomplishing this resides in the bend of the tool. With this tool applied to a turning tool-holder I am enabled to bore out holes up to two inches in depth and of most practical diameters.

I claim:

1. In combination with a conventional turning tool-holder having an angularly disposed tool-holding socket rectangular in cross-section, a tool having an elongated shank of similar cross-section registering in said socket and adjustably locked therein, said tool being formed with a portion projected from the forward part of the shank at a considerable obtuse angle, and having plane faces, and a cutting member toward the end thereof having its cutting edge extending outwardly from a face of said portion, whereby the tool held in a turning tool-holder is adapted to be used as a boring tool.

2. In combination with a conventional turning tool-holder having an angularly disposed tool-holding socket, a tool having an elongated shank adapted to register in said socket and to be locked therein for use, said tool being formed with a portion extending angularly from the shank and having plane faces and integrally formed on a face thereof a cutting member, said cutting member being formed of a multiplicity of plane faces converging to a point and having the resulting cutting point extended outside of the limits of any face of said angular extended portion, whereby the tool held in a turning tool-holder is adapted to be used as a boring tool.

ELMER A. FUGLIE.